(12) United States Patent
Fujita

(10) Patent No.: US 6,252,837 B1
(45) Date of Patent: Jun. 26, 2001

(54) ERROR COMPENSATION DEVICE FOR A DISK SIGNAL REPRODUCTION APPARATUS

(75) Inventor: Yoshikazu Fujita, Osaka (JP)

(73) Assignee: Funai Electric Co. Ltd., Osaka (JP)

( * ) Notice: Subject to any disclaimer, the term of this patent is extended or adjusted under 35 U.S.C. 154(b) by 0 days.

(21) Appl. No.: 09/305,082

(22) Filed: May 4, 1999

(30) Foreign Application Priority Data

May 8, 1998 (JP) .................................................. 10-142149

(51) Int. Cl.[7] .................................................. G11B 7/005
(52) U.S. Cl. .................................... 369/47.17; 369/47.27; 369/53.15; 369/53.35
(58) Field of Search .............................. 369/47.14, 47.17, 369/47.25, 47.27, 53.15, 53.16, 53.17, 53.28, 53.33, 53.35

(56) References Cited

U.S. PATENT DOCUMENTS

| | | | |
|---|---|---|---|
| 4,017,677 | * | 4/1977 | Baker . |
| 4,309,726 | * | 1/1982 | Tanaka et al. . |
| 5,428,592 | * | 6/1995 | Endo ........................................ 369/48 |
| 5,598,390 | * | 1/1997 | Saitoh et al. ............................ 369/50 |

FOREIGN PATENT DOCUMENTS

| | | |
|---|---|---|
| 6-12773 | 1/1994 | (JP) . |
| 6-168541 | 6/1994 | (JP) . |

\* cited by examiner

Primary Examiner—W. R. Young
(74) Attorney, Agent, or Firm—Morgan, Lewis & Bockius LLP

(57) ABSTRACT

An error compensation device for a disk signal reproduction apparatus that reads out data from a disk on which the data is recorded along a spiral track, such as a CD, and reproduces a signal. The error compensation device includes a data read unit which reads out data from a disk, a signal memory unit which stores output data of the read unit, a servo control unit which controls the read unit, a microcomputer which controls the servo control unit and the signal memory unit, a storage unit for microcomputer control which controls the control microcomputer, a D/A conversion unit which coverts the output of the signal memory unit, and a signal mute unit which is controlled by the microcomputer. When there is a region from which disk data cannot be reproduced, the storage unit for microcomputer control stores the region as an error region. Signals stored in the signal memory unit are sequentially read out at a reference speed to reproduce the signals. When the reproduced output data is those of the error region, the mute unit mutes a transmission signal.

2 Claims, 3 Drawing Sheets

ERROR COMPENSATION DEVICE FOR A DISK SIGNAL REPRODUCTION APPARATUS

BACKGROUND OF THE INVENTION

1. Field of the Invention

The present invention relates to an error compensation device for a disk signal reproduction apparatus that reads out digital data from a digital disk on which the digital data is recorded along a spiral track, such as a CD, and reproduces a signal.

2. Description of the Related Art

Conventionally, in a digital audio disk, when there is a region from which signal pits of the disk cannot be read by an optical pickup because of a damage of the disk, contamination, or the like, a problem is produced that reproduction of an audio signal is stopped there, or, even when reproduction of the audio signal is continued, the reproduced sound is once interrupted and a time lag is produced in the reproduced music.

Japanese Patent Unexamined Publication No. Hei. 6-12773 discloses the following technique. When audio data is read out from data on a disk and an audio signal is reproduced at a high speed, a memory for CD-ROM data is used as an input buffer memory of an audio signal processing unit. While EFM demodulated data is sequentially written into the memory, the written data is sequentially read out at the single speed. When the writing of data into the audio signal processing unit almost exceeds the read address, the data writing is stopped, only the reading is conducted, and an optical pickup is jumped back by a predetermined number of tracks. At the timing when a vacant area is produced in the memory, the data after the stop of the writing is again written into the memory.

Japanese Patent Unexamined Publication No. Hei. 6-168541 discloses the following technique. "A quintuple speed mode or a double speed mode is set as a special reproduction mode. In the case where an instruction for automatic level response is given, the sound state is checked. If the current state is a silent state, the system waits for generation of sound for a constant time period. If sound is generated, data of the sound signal is written into a memory. The sound signal data is read out from the memory, namely, the timing of starting the reproduction of the sound signal is changed, so that the rising of the sound is reproduced. In the case where an instruction for forced level response is given, the timing of starting the reproduction is changed irrespective of the sound state, so that the rising of the sound is reproduced."

In both of the conventional techniques, when there is a region from which signal pits of a disk cannot be read by an optical pickup because of a damage of the disk, contamination, or the like, there arises a problem that reproduction of an audio signal is stopped, or, even when reproduction of the audio signal is continued, the reproduced sound is once interrupted and a time lag is produced in the reproduced music.

SUMMARY OF THE INVENTION

It is an object of the invention to provide an error compensation device for a disk signal reproduction apparatus which can solve the problem of the conventional techniques that, when there is a region from which signal pits of a disk cannot be read by an optical pickup because of a damage of the disk, contamination, or the like, reproduction of an audio signal is stopped, or, even when reproduction of the audio signal is continued, the reproduced sound is once interrupted and a time lag is produced in the reproduced music, and which can therefore prevent such a time lag from being produced in the reproduced music.

In order to achieve the above object, according to the invention, there is provided an error compensation device for a disk signal reproduction apparatus, comprising: a data read unit which reads out data from a disk on which the data is recorded along a spiral track; a signal memory unit which stores output data of the data read unit; a servo control unit which controls operations of focussing and tracking in the data read unit; a control microcomputer which controls the servo control unit and the signal memory unit; a storage unit for microcomputer control which controls the control microcomputer; a D/A conversion unit which coverts data stored in the signal memory unit into an analog signal; and a signal mute unit which is connected to a signal transmission path in a preceding or subsequent stage of the D/A conversion unit and which is controlled by the microcomputer, wherein when there is an unreproducible region in which, during a process of reading out a signal from the disk, reading of data is disabled by a tracking failure due to a damage of the disk or contamination, the storage unit for microcomputer control stores the region as an error region, signal data stored in the signal memory unit is sequentially read out at a reference speed to reproduce a signal, and, if, during reproduction, it is detected from a read control signal from the storage unit for microcomputer control that reproduced output data is data read out from the error region, the signal mute unit mutes a transmission signal.

DETAILED DESCRIPTION OF THE PREFERRED EMBODIMENT

Hereinafter, an embodiment of an error compensation device for a disk signal reproduction apparatus according to the invention will be described with reference to the accompanying drawings.

Figure 1:
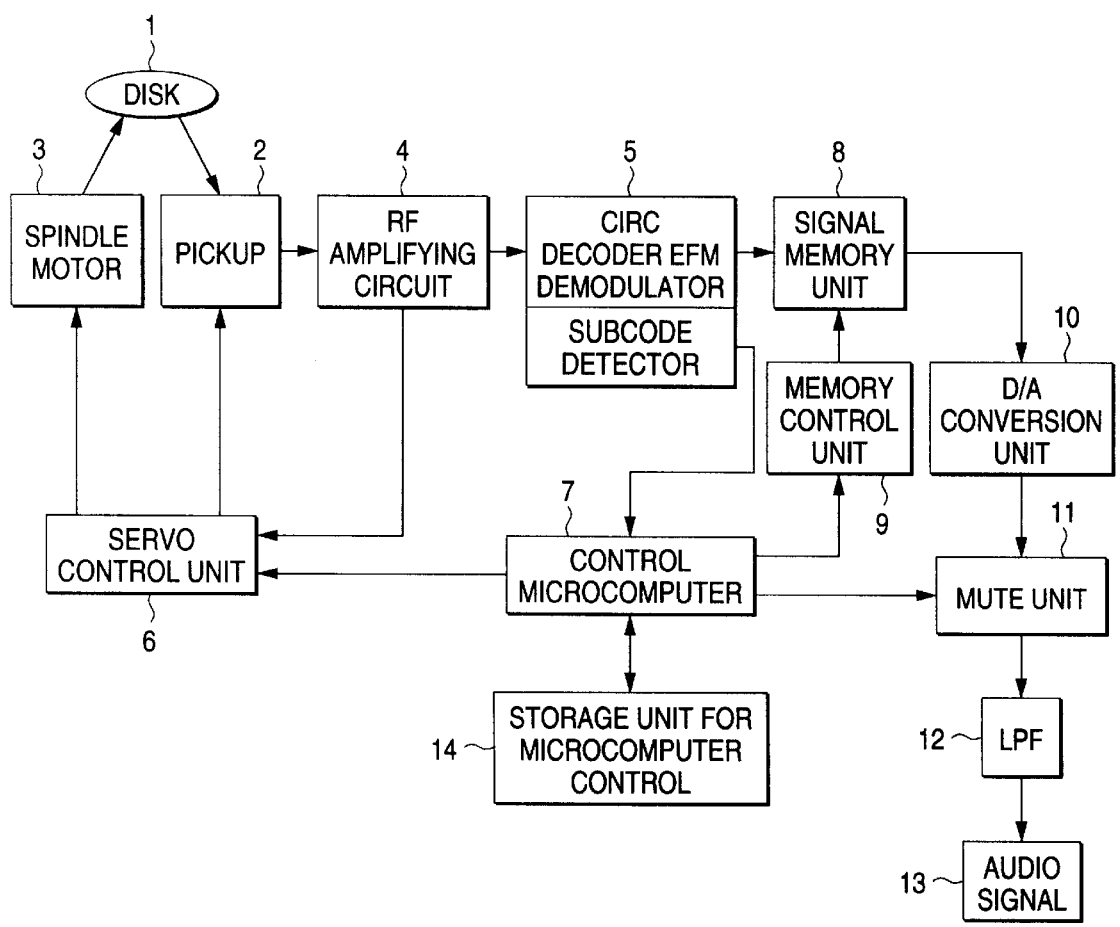
FIG. 1 is a block diagram showing an embodiment of an error compensation device for a disk signal reproduction apparatus according to the invention.

FIG. 1 is a block diagram of the embodiment of the invention. Referring to the figure, a digital disk 1 is a disk on which data is recorded along a spiral track, or specifically a music signal is recorded. At the center of the disk-like body of the disk 1, formed is a center hole (not shown) through which a spindle (not shown) is to be passed. A pickup 2 is a block having components such as light receiving elements for focusing and data reading, and optically reads pit data which is engraved along a spiral track in the recording face of the digital disk 1. The disk 1 is rotated by a spindle motor 3. The signal data read from the disk 1 is supplied to an RF amplifying circuit 4 and then to a CD signal processing unit 5 which comprises a CIRC decoder, an EFM demodulator, and a subcode detector. The output signal of the RF amplifying circuit 4 is supplied also to a servo control unit 6. The servo control unit 6 controls the operations of focussing, tracking, feeding, and the like, and the rotation of the spindle motor 3. The output signal of the CD signal processing unit 5 is supplied to a control microcomputer 7 which controls the servo control unit 6. The signal of the CD signal processing unit 5 is stored in a signal memory unit 8. This storing operation is controlled by a memory control unit 9. The output of the signal memory unit 8 is converted into an analog audio signal by a D/A conversion unit 10. The audio signal is passed through a mute unit 11 which is controlled by the control microcomputer 7, and then formed into a smoothed audio signal 13 by a low-pass filter 12.

Occasionally, there exists an unreproducible region in which, when the pickup 2 reads a signal from the disk 1, the reading of data is disabled by a tracking failure or the like due to a damage of the disk, contamination, or another reason.

During a process in which the pickup 2 reads a signal from the disk 1 and an audio signal is reproduced, while EFM demodulated data which are read out from the disk at a speed that is higher than a reference reproduction speed, e.g., a quadruple speed is written and stored into the signal memory unit 8 in units of frame, the written EFM demodulated data is read out from the signal memory unit 8 at the reference speed, and then sent to the D/A conversion unit 10. When the address of the writing of the EFM demodulated data into the signal memory unit 8 almost exceeds the read address, the data writing is temporarily stopped, and only the reading is conducted. Namely, the data reading from the disk is waited until a vacant area is provided in the signal memory unit 8, and the pickup 2 is jumped back by a predetermined number of tracks and then the data reading is conducted. The address at which the reading is to be conducted is acquired by obtaining an address on the disk by means of a SUB-Q signal allocated to each frame. If the obtained address coincides with the address at which the reading is to be conducted, the signal reproduction operation is conducted without performing a further process. However, if the obtained address does not coincide with the address at which the reading is to be conducted because the reading of data is disabled by a tracking failure or the like due to a damage of the disk 1, contamination, or another reason, the process of signal data on the disk is repeated several times. If the reading remains disabled even after the repetition, the questioned region is judged as an unreproducible region in which the reading of data is disabled, and then stored in units of frame into a storage unit for microcomputer control 14 as an error frame region. In response to a control signal from the control microcomputer, the mute unit 11 is operated so that the period of the error frame is set to have no signal or muted and connected so as not to produce a time lag.

Then, the reading is again started from the next frame and the reproduction operation is continued. As a result, also in the period of the unreproducible region, the reproduction of music or the like is conducted in correct time relationship. In this case, sound data is accumulated in the signal memory unit 8 and therefore, when judgment that the reading operation cannot be conducted on the questioned region is made before reproduction of data in the signal memory unit 8 is completed and the next region is then read out, the signal can be reproduced without impairing the sound flow (continuity)

Figure 2:
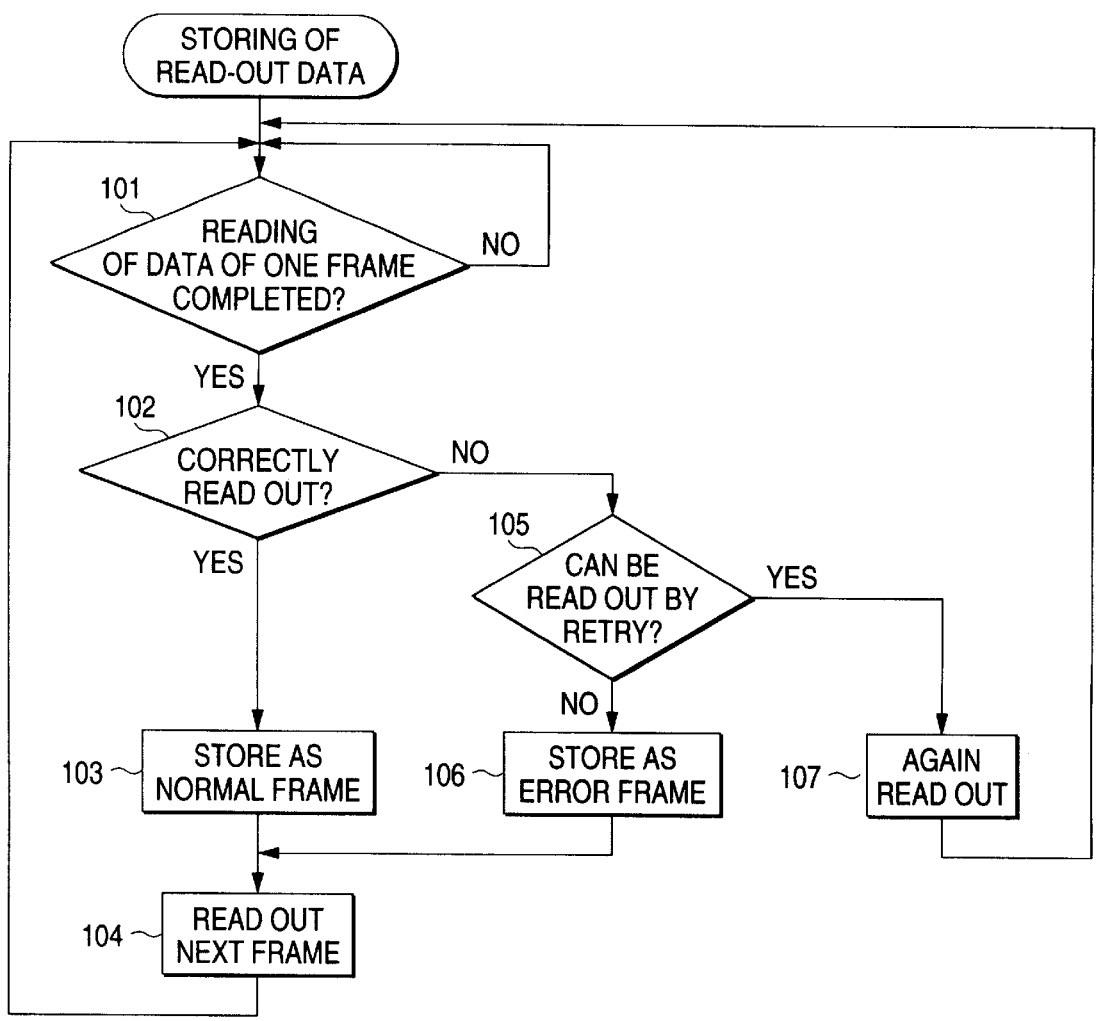
FIG. 2 is a flowchart showing an operation of storing read-out data in a signal memory unit in the embodiment.

FIG. 2 is a flowchart showing an operation of storing read-out data in the signal memory unit 8.

First, it is checked in step 101 whether the reading of data of one frame has been completed in the signal memory unit 8 or not. If it has been completed (Yes), the control proceeds to step 102 to check whether the signal has been correctly read out or not. If the signal has been correctly read out (Yes), the control proceeds to step 103 in which the frame is stored as a normal frame into the storage unit for microcomputer control 14. The control further proceeds to step 104 to read out the next frame. If it is judged in step 102 that the signal has not been correctly read out (No), the control proceeds to step 105 in which the operation of processing a signal on the disk is again repeated and it is checked whether the signal is correctly read out or not. If the signal remains unreadable (No), the control proceeds to step 106, and the frame is stored as an error frame into the storage unit for microcomputer control 14. If it is judged in step 105 that the signal is correctly read out, the control returns to step 101 through step 107.

Figure 3:
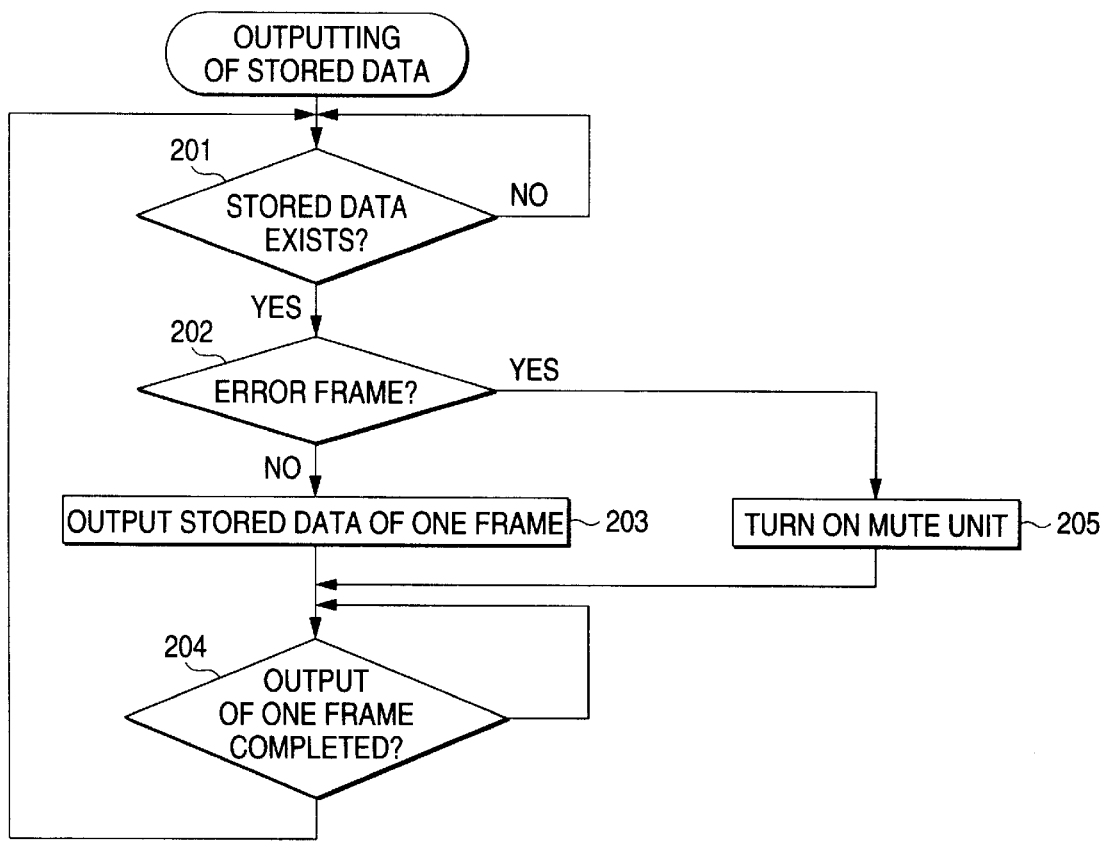
FIG. 3 is a flowchart showing an operation of outputting stored data in the signal memory unit in the embodiment.

FIG. 3 is a flowchart showing an operation of outputting stored data in the signal memory unit 8.

First, it is checked in step 201 whether stored data exists in the signal memory unit 8 or not. If stored data exists (Yes), the control proceeds to step 202. If it is judged in step 201 that no data is stored (No), the control returns to the initial step to again check the existence of stored data. In step 202, it is checked whether the stored data is data read out from the error frame or not. If the stored data is not data read out from the error frame (No), the control proceeds to step 203. If it is judged in step 202 that the stored data are data read out from the error frame (Yes), the control proceeds to step 205. In step 203, stored data of one frame is output, and the control then proceeds to step 204 to check whether the output of data of one frame has been completed or not. If the output of data of one frame has been completed (Yes), the process returns to step 201 to repeat the above operations. In step 205, the mute unit 11 is operated so that the error frame is muted so as not to produce a sound.

The mute unit 11 may be connected in series to any position of the signal transmission path as far as the unit is in the subsequent stage of the signal processing unit 5. For example, the mute unit 11 may be connected to the input side of the D/A conversion unit 10.

A single unit may be shared by the memory control unit 9 and the storage unit for microcomputer control 14.

As described above, in the error compensation device for a disk signal reproduction apparatus according to the invention, when there is an unreproducible region in which, during a process of reading out a signal from a disk, reading of data is disabled by a tracking failure or the like due to a damage of the disk, contamination, or another reason, the region is stored as an error region, signal data stored in the signal memory unit is sequentially read out at a reference speed to reproduce a signal, and, if it is detected that reproduced output data is data read out from the error region, a transmission signal is set to be zero or muted by muting means, and then connected to the next frame. Therefore, the invention can attain effects that the problem that reproduction of an audio signal is stopped, or, even when reproduction of the audio signal is continued, the reproduced sound is once interrupted and a time lag is produced in the reproduced music is solved, and that the reproduced music is entirely free from a time lag.

What is claimed is:

1. An error compensation device for a disk signal reproduction apparatus, comprising:

a data read unit which reads out data from a disk on which the data is recorded along a spiral track;

a signal memory unit which stores output data of said data read unit;

a servo control unit which controls operations of focussing and tracking in said data read unit;

a control microcomputer which controls said servo control unit and said signal memory unit;

a storage unit for microcomputer control which controls said control microcomputer;

a D/A conversion unit which converts data stored in said signal memory unit into an analog signal; and a signal mute unit which is connected to a signal transmission path in a preceding or subsequent stage of said D/A conversion unit and which is controlled by said microcomputer, wherein when there is an unreproducible region in which, during a process of reading out a signal from the disk, reading of data is disabled by a tracking failure due to a damage of the disk or contamination, said storage unit for microcomputer control stores the region as an error region, signal data stored in said signal memory unit is sequentially read out at a reference speed to reproduce a signal, and, if, during reproduction, it is detected from a read control signal from said storage unit for microcomputer control that reproduced output data is data read out from the error region, said signal mute unit mutes a transmission signal.

2. The error compensation device for a disk signal reproduction apparatus according to claim 1, wherein, during reproduction of the signal, data which is read out from the disk at a speed that is higher than the reference speed is written and stored into said signal memory unit in units of frame; a data signal is read out at the reference speed from said signal memory unit; data reading from the disk is waited until a vacant area is provided in said signal memory unit, and thereafter conducted; during the reading, an address is acquired by obtaining an address on the disk by means of a SUB-Q signal allocated to each frame, thereby knowing an address at which the reading is to be conducted; if the obtained address does not coincide with the address at which the reading is to be conducted, a process of signal data on the disk is repeated several times; if the reading remains disabled even after the repetition, said storage unit for microcomputer control stores the error region as an error frame region; and the reading is again started from a next frame.

\* \* \* \* \*